J. J. GREGSON.
CRANK AND TAPPET SHAFT OF LOOMS FOR WEAVING CLOTH.
APPLICATION FILED DEC. 31, 1912.
1,105,648.
Patented Aug. 4, 1914.
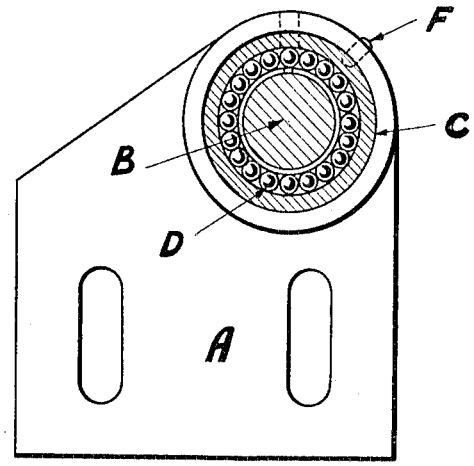
FIG. 1.
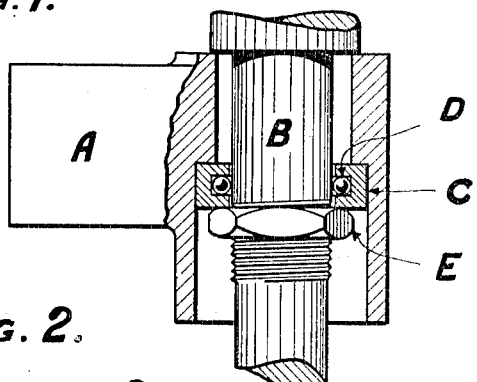
FIG. 2.
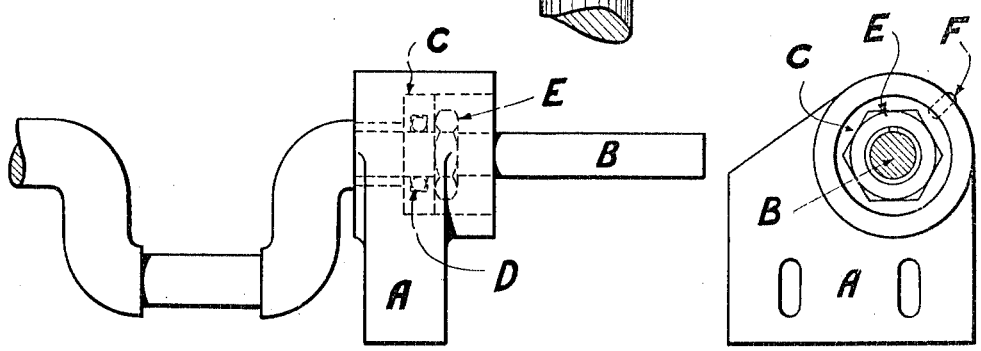
FIG. 3.
FIG. 4.
Witnesses:-
John C. Sanders
Albert F. Heuman
Inventor:-
John James Gregson
By his Attorney:- Thos Wallace White

UNITED STATES PATENT OFFICE.

JOHN JAMES GREGSON, OF FULWOOD, NEAR PRESTON, ENGLAND.

CRANK AND TAPPET SHAFT OF LOOMS FOR WEAVING CLOTH.

1,105,648. Specification of Letters Patent. Patented Aug. 4, 1914.

Application filed December 31, 1912. Serial No. 739,444.

*To all whom it may concern:*

Be it known that I, JOHN JAMES GREGSON, a subject of the King of Great Britain and Ireland, and resident of Fulwood, near Preston, Lancashire, England, have invented certain new and useful Improvements Relating to Crank and Tappet Shafts of Looms for Weaving Cloth, of which the following is a specification.

My invention relates to improvements relating to crank and tappet shafts of looms for weaving cloth, and consists in the application thereto or combination therewith of anti-friction bearings whereby the highest speeds may be obtained with less driving power than heretofore.

A further object is to provide for the bearings being readily adjusted or overhauled.

I attain these objects by the mechanism illustrated in the accompanying drawing in which, Figure 1 illustrates a sectional end view and Fig. 2 a plan of one form of anti-friction bearing applied to the crank or tappet shaft of a loom. Fig. 3 illustrates the crank end of a shaft with an improved bearing applied and Fig. 4 illustrates an end view of same.

As shown A represents the bush or bearing bracket and B the crank or tappet shaft supported therein. The boss or bearing part of the bracket A is hollowed out from one end for rather more than half its length, and within the recess thus formed is fitted a hardened steel channel-shaped ring C, the ring lying against the shoulder formed by the recessing of the bearing. Within the said ring, which forms a race, and contacting with such ring and the shaft is a series of hardened steel balls D. By means of a nut E screwing on the shaft B (this latter being formed with a screwed part) the ring C is held against endwise movement, while by means of a grub screw F the ring is prevented rotating around the shaft. If desired there may be two or more rings and series of balls, or a single ring with a series of races and balls for each. When two or more single rings are used they may be separated by loose collars. While preferring the use of ball, rollers may be used, either instead of or in conjunction therewith. The ring C will preferably be made solid and placed in position, with the balls, by being passed over the end of the shaft. The ring may, however, be formed in two parts to facilitate the mounting of the same around the shaft, should it not be convenient to pass the ring over the end.

Crank and tappet shafts running in ball or roller bearings run more freely and require less attention as regards oiling and take much less power to drive because of the friction being reduced to a minimum.

What I claim is:—

In crank and tappet shafts for looms, in combination, a bearing having a through bore of two diameters and having a shoulder at the junction of said diameters, an internal ring of hardened steel forming a ball race, hardened steel balls within said ball race, said ring fitting the larger diameter and against the shoulder in the said bearing, means for holding the ring against rotation, a shaft having three diameters rotatably mounted with its middle diameter in said ball race, the larger diameter of the shaft forming a collar outside the bearing, an adjusting nut on the end of that part of medium diameter near the smallest diameter, said part being screw-threaded to receive the nut and said nut and collar holding the shaft against longitudinal movement, as set forth.

In witness whereof I have hereunto set my hand in the presence of two witnesses.

JOHN JAMES GREGSON.

Witnesses:
JOSEPH HASLAUS,
WILLIAM I. FOX.